Sept. 19, 1933.  R. CONRADER  1,927,153
PRESSURE RESPONSIVE DEVICE
Filed March 7, 1929
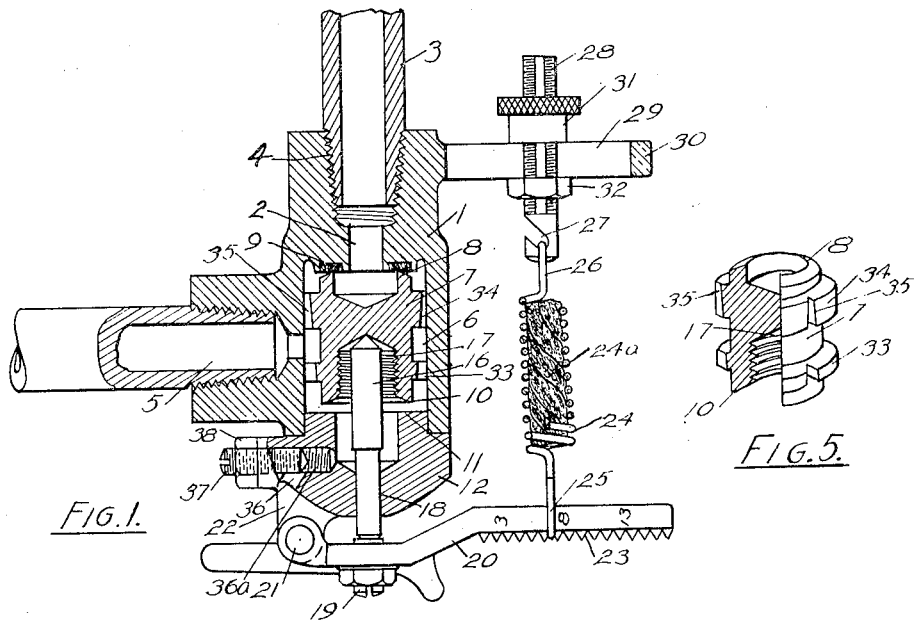
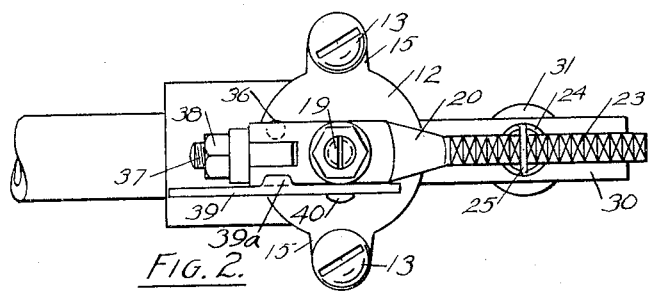
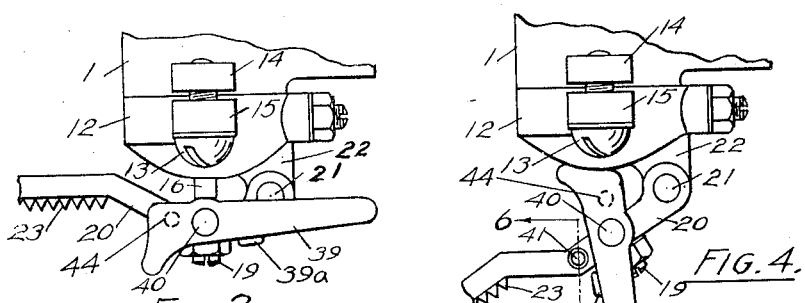
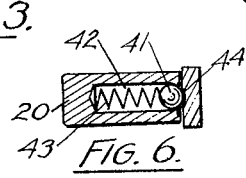
INVENTOR.
Rudolph Conrader Deceased
by Sophia Conrader +
Anna Laura Conrader Seitz
Executrices
ATTORNEYS.

Patented Sept. 19, 1933

1,927,153

UNITED STATES PATENT OFFICE 1,927,153

PRESSURE RESPONSIVE DEVICE

Rudolph Conrader, deceased, late of Erie, Pa., by Sophia Conrader and Anna Laura Conrader Seitz, executrices, both of Erie, Pa.

Application March 7, 1929. Serial No. 345,012

3 Claims. (Cl. 251—118)

This invention is designed to improve pressure responsive devices. Such devices are usually used as controls in response to pressure and one of the features of this invention is to be able to conveniently lock such pressure device in a set position. This is particularly advantageous in connection with the structure set forth in Letters Patent issued to Rudolph Conrader, #1,601,943, October 5th, 1926. Another feature of the invention relates to providing pressure responsive devices in which there is a pressure-actuated device opposing a counter-pressure device with a dampening mechanism. This is of particular advantage in connection with the invention set forth in the above-stated patent as such devices when sensitively balanced have a tendency to vibrate, or oscillate at the critical pressure at which said devices respond. Features and details of the invention will appear from the specification and claims.

A preferred embodiment of the invention is illustrated in the accompanying drawing as follows:—

Fig. 1 shows a central section through the device.

Fig. 2 a plan view of the device, viewed from the bottom.

Fig. 3 a side elevation of the lower part of the mechanism showing the setting mechanism for locking the pressure device with said device in inoperative position.

Fig. 4 a similar view with the setting mechanism in set position.

Fig. 5 a perspective view, partly in section, of the valve plunger and valve.

Fig. 6 a section on the line 6—6 in Fig. 4 but with the parts swung to the position shown in Fig. 3.

1 marks the body. This has an inlet passage 2 leading from an inlet pipe 3, the inlet pipe being secured by a threaded end 4. The body is also provided with a discharge passage 5 extending from the side of the body. The body is provided with a cylinder 6 and a valve plunger 7 operates in this cylinder. The valve plunger has a valve 8 at the inlet end which operates on a seat 9 at the end of the cylinder. The plunger is also provided with a valve face 10 which operates upon a valve seat 11 at the opposite end of the cylinder. The exposed area on the valve with the valve closed, as shown in Fig. 1, is slightly less than the exposed pressure area on the valve when it is seated on the seat 11.

The seat 11 is arranged on a head 12 which is secured to the body by means of bolts 13, these bolts extending through ears 14 and 15 on the body and head respectively.

A push pin 16 is seated in a socket 17 in the plunger 7 and extends through an opening 18 in the head 12 and operates against a hardened pin 19 in a lever 20.

The lever 20 is pivoted on a pin 21 carried by an ear 22 on the head 12. The lever is provided with a series of notches 23 and a spring 24 has a loop 25 at its end which is adapted to seat in the notches 23. The upper end of the spring has a similar loop 26 which is secured in a notch 27 at the end of an adjusting screw 28. The adjusting screw 28 extends through a slot 29 in an arm 30 extending from the body and the screw is provided with a nut 31 by means of which the strength of the spring, or initial tension may be adjusted. A lock nut 32 is provided for locking the screw as adjusted.

The valve plunger has closure rings 33 and 34 which also act as guides in the cylinder. These are provided with minute openings 35 which are tapered toward the outlet. The purpose of this shape of these openings is to prevent clogging, anything passing the smaller end being readily discharged through this opening. A waste opening 36 is arranged at the lower end of the head and extends from a screw-threaded opening 36a communicating with the cylinder. A screw-threaded pin 37 operates in the screw-threaded opening 36a over the opening 36 and adjusts the opening 36 so that this discharge may be restricted as desired. The pin 37 is locked in adjustment by a lock nut 38.

It will be noted that the opening from the seat 11 to the atmosphere is through the restricted opening 36 so that the valve 8 is between the inlet and the discharge.

The operation of so much of the device is as follows: When the pressure at the inlet becomes above the desired maximum, it opens the valve against the spring pressure and as soon as opened by reason of the exposed area of the seat it is snapped to the opposing seat. The increased area of the opposed, or outlet seat gives a greater exposed area of valve so that it remains on this seat until the pressure is so reduced that the spring will readily return the valve 8 to the seat 9. As soon as the valve face 10 starts from its seat pressure is delivered below the valve and held momentarily by reason of the minute character of the restricted opening 36, thus balancing the valve for the moment until it is seated in its initial position.

By adjusting the spring 24 any initial resistance may be provided so as to give the desired maximum pressure at which the valve will open. The range in pressure between the opening and closing of the valve is accomplished by adjusting the spring along the lever 20. When the spring is adjusted toward the outer end of the lever the spring is more extended than toward the inner end of the lever with the opening of the valve and consequently a greater difference of pressure is delivered to the valve in its open position than when the spring is adjusted toward the inner end of the valve. The consequence is that the range of pressure between the opening and closing of the valve is much less with the spring arranged at the outer end of the lever 20 than at the inner end of the lever 20. In this way a very wide range of opening and closing pressure may be easily accomplished. So far as described, except for the adjustability of the minute opening 36 the structure is in exact accordance with the structure described in the patent above referred to.

It is often desirable to lock the valve in its open position so that the mechanism controlled by the valve, as the unloader, or similar device, is maintained in an unloaded position regardless of the pressure. To accomplish this a setting finger 39 is pivoted on a pin 40 on the lever 20 and is adapted to be swung into engagement with the body in which position it locks the lever in its lower position and thus relieves the valve of the pressure of the spring. The valve under these conditions will remain seated on the seat 11, thus continuously communicating pressure through the body. A ball 41 is arranged in a socket 42 in the lever and a spring 43 forces the ball outwardly slightly beyond the face of the lever, the socket being headed in at its opening edge to retain the ball. The setting finger has a detent 44 which is engaged by the ball when the finger is moved to inoperative position, as shown in Fig. 1. This maintains the finger in its inoperative position against accidental swinging to set position.

In devices of this kind there is a tendency for fluctuation, or vibration, when the pressure reaches the critical pressure at which the device operates. Under such conditions there is a tendency for the mechanism to move back and forth under the nearly balanced pressures. I prefer to dampen this movement by a yielding engagement of one of the moving parts and preferably the coils of the spring. To accomplish this I insert into the spring a small length of cord, or rope 24a which yieldingly engages the coils so that the coils, as the spring is expanded and contracted, rub on the cord. This effectually dampens the movement so as to prevent the fluctuation, or oscillation above referred to. This cord is preferably saturated with oil and this tends to lubricate the spring and also to preserve it against rusting. A stop lug 39a is preferably provided which engages the lever 20 and stops a movement of the lever handle to a position interfering with the operation of the device.

What I claim as new is:—

1. In a pressure responsive device, the combination of a body; a fluid pressure-actuated means in the body; counter-pressure means comprising a coiled spring opposing the fluid pressure-actuated means; and a dampening device retarding and dampening vibratory movement of said means, said dampening device comprising a fiber cord inserted within the coils of the spring and yieldingly frictionally engaging said coils.

2. In a pressure responsive device, the combination of a body having opposing valve seats; connecting valves operating alternately on said seats, the pressure exposed area on one valve being greater than the pressure exposed area on the other valve; a counterpressure mechanism comprising a lever; a coiled spring operating on the lever; and a dampening device yieldingly engaging the coils of the spring comprising a fiber cord arranged within the coils of the spring.

3. In a pressure responsive device, the combination of a body having opposing valve seats; connecting valves operating alternately on said seats, the pressure exposed area on one valve being greater than the pressure exposed area on the other valve; a counterpressure mechanism comprising a lever; a coiled spring operating on the lever; and a dampening device yieldingly engaging the coils of the spring comprising a fiber cord arranged within the coils of the spring, said fiber cord being saturated with oil.

SOPHIA CONRADER,
ANNA LAURA CONRADER SEITZ,
*Executrices of Rudolph Conrader, Deceased.*